(12) United States Patent
Zheng et al.

(10) Patent No.: US 8,467,632 B2
(45) Date of Patent: Jun. 18, 2013

(54) WAVEGUIDE ELECTRO-ABSORPTION MODULATOR

(75) Inventors: Xuezhe Zheng, San Diego, CA (US); John E. Cunningham, San Diego, CA (US); Ashok V. Krishnamoorthy, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 351 days.

(21) Appl. No.: 12/986,062

(22) Filed: Jan. 6, 2011

(65) Prior Publication Data

US 2012/0177318 A1    Jul. 12, 2012

(51) Int. Cl.
*G02F 1/01* (2006.01)

(52) U.S. Cl.
USPC .................................................................. 385/1

(58) Field of Classification Search
None
See application file for complete search history.

(56) References Cited

U.S. PATENT DOCUMENTS

| | | | |
|---|---|---|---|
| 6,687,425 B2 * | 2/2004 | Ridgway et al. | 385/14 |
| 7,583,869 B2 * | 9/2009 | Kang et al. | 385/14 |
| 7,853,103 B2 * | 12/2010 | Blauvelt et al. | 385/39 |
| 8,116,600 B2 * | 2/2012 | Okamoto et al. | 385/3 |
| 8,300,990 B2 * | 10/2012 | Li et al. | 385/2 |
| 2003/0095751 A1 * | 5/2003 | Rogers et al. | 385/43 |

* cited by examiner

*Primary Examiner* — Sung Pak
(74) *Attorney, Agent, or Firm* — Park, Vaughan, Fleming & Dowler, LLP; Steven E. Stupp

(57) ABSTRACT

During operation of an electro-absorption modulator, an optical signal is conveyed, using an optical waveguide in the electro-absorption modulator, to a semiconductor layer that substantially fills a gap between two portions of the optical waveguide. Then, the optical signal is electro-absorption modulated by selectively applying a voltage to electrodes that produces an electric field, approximately perpendicular to the midline of the optical waveguide, in the semiconductor layer. These electrodes are coupled to the edges of the semiconductor layer at the periphery along the width of the semiconductor layer by intervening layers. Furthermore, the intervening layers include a material that has a lower index of refraction than the semiconductor layer, and a lower optical absorption than the electrodes.

20 Claims, 8 Drawing Sheets

WAVEGUIDE ELECTRO-ABSORPTION MODULATOR

GOVERNMENT LICENSE RIGHTS

The United States Government has a paid-up license in this invention and the right in limited circumstances to require the patent owner to license others on reasonable terms as provided for by the terms of Agreement No. HR0011-08-9-0001 awarded by the Defense Advanced Research Projects Administration.

BACKGROUND

1. Field

The present disclosure generally relates to electro-absorption-modulator devices. More specifically, the present disclosure relates to a waveguide electro-absorption-modulator device.

2. Related Art

Silicon photonics is a promising new technology that can potentially provide low-power, high-bandwidth and low-latency interconnects in future computing systems. However, in order to implement silicon photonic links, efficient light modulators are needed. It is complicated to construct efficient light modulators because the electro-optic effect in silicon (Si) is weak. As a consequence, a number of alternate light-modulation mechanisms are being investigated. Two promising light-modulation mechanisms are the electro-absorption associated with the quantum-confined stark effect (QCSE) in SiGe/Ge quantum-well (QW) devices, and the electro-absorption associated with the Franz-Keldysh (FK) effect in tensile-strained germanium (Ge).

QCSE provides a strong electro-absorption mechanism, and has been used to make high-speed, low-power and compact opto-electronic devices using III-V materials. In practice, electro-absorption associated with the QCSE in a multiple QW structure that includes germanium QWs which are separated by silicon-germanium barriers can offer a much stronger electro-optic effect than a depletion-based silicon light modulator. Consequently, silicon-germanium QCSE devices can provide broadband operation with low driver voltage. In addition, the same QCSE device can be used as either a light modulator or a photo detector.

Similarly, increased electro-absorption (relative to silicon) can also be achieved using the FK effect in $Ge_{1-x}Si_x$ (for example, using the enhanced FK effect in tensile strained, epitaxial germanium-on-silicon). Because the FK effect takes place on a sub-picosecond time scale, the speed of the electro-absorption mechanism based on the FK effect is only limited by the RC delay, and can be designed to achieve very high bandwidth. Moreover, the same FK-effect device can also be used as a photo detector with high responsivity and high bandwidth.

Recently, a germanium FK light modulator has been demonstrated using an enhanced FK effect in tensile strained, epitaxial germanium-on-silicon using a vertical αSi—Ge-αSi structure. One problem associated with this approach is that the light modulator is fabricated in a different layer than the silicon waveguide layer. To address this, special vertical evanescent coupling from the crystal-silicon waveguide in a silicon-on-insulator (SOI) layer to a poly-silicon waveguide in the germanium layer can be used to implement an optical input/output (I/O) for the light modulator. However, the special vertical evanescent coupling increases the complexity of the optical device and increases optical losses.

Hence, what is needed is an electro-absorption-modulator device that does not suffer from the above-described problems.

SUMMARY

One embodiment of the present disclosure provides an electro-absorption modulator. This electro-absorption modulator includes a substrate, and an optical waveguide, disposed on the substrate, having two portions separated by a gap. Moreover, a semiconductor layer is disposed on the substrate and substantially fills the gap. This semiconductor layer is coupled to the two portions of the optical waveguide, has approximately the same width and approximately the same height as the two portions, and has a first edge and a second edge at a periphery along the width of the semiconductor layer. Furthermore, first and second intervening layers in the electro-absorption modulator are disposed on the substrate distal from a midline of the semiconductor layer and are, respectively, coupled to the first edge and the second edge. These intervening layers include a material. Additionally, first and second electrodes are coupled, respectively, to the first intervening layer further distal from the midline than the first edge, and further distal from the midline than the second edge. Note that the material has a lower index of refraction than the semiconductor layer, a lower optical absorption than the first electrode, and a lower optical absorption than the second electrode.

In some embodiments, the semiconductor layer includes germanium and/or indium-phosphide. Moreover, the material may include one of polycrystalline silicon, crystalline silicon, indium tin oxide and a semi-metal contact layer. This material may be doped. For example, the doping concentration may be between $10^{17}/cm^3$ and $10^{19}/cm^3$.

Furthermore, the first and second electrodes may be disposed on the substrate in a different vertical layer than that of the optical waveguide and the semiconductor layer. The first electrode may be coupled to the first intervening layer by a first via, and the second electrode may be coupled to the second intervening layer by a second via.

Note that the substrate may include a different semiconductor than the semiconductor layer. For example, the different semiconductor may include silicon.

In some embodiments, the electro-absorption modulator includes a buried-oxide layer deposited on the substrate, where the optical waveguide and the semiconductor layer are disposed on the buried-oxide layer.

Another embodiment provides a method for electro-absorption modulating an optical signal using the electro-absorption modulator. During operation, the optical signal is conveyed, using the optical waveguide, to the semiconductor layer that substantially fills the gap between the two portions of the optical waveguide. Then, the optical signal is electro-absorption modulated by selectively applying a voltage to the electrodes that produces an electric field, approximately perpendicular to the midline of the optical waveguide, in the semiconductor layer. Note that these electrodes are coupled to the edges of the semiconductor layer at the periphery along the width of the semiconductor layer by intervening layers, where the intervening layers include the material.

Another embodiment provides an electro-absorption modulator. This electro-absorption modulator includes a substrate, and an optical waveguide, disposed on the substrate, having a slot approximately coaxial with a midline of the optical waveguide. Note that the slot has a depth approximately equal to a height of the optical waveguide and a width that is less than a width of the optical waveguide, where two regions of the optical waveguide external to the slot along a width of the optical waveguide are doped. Moreover, a semiconductor layer is disposed on the substrate and substantially fills the slot. Furthermore, first and second intervening layers in the electro-absorption modulator are disposed on the substrate distal from a midline of the optical waveguide and are, respectively, coupled to a first edge of a first of the regions and a second edge of a second of the regions. These intervening layers include a material. Additionally, first and second electrodes are coupled, respectively, to the first intervening layer further distal from the midline than the first edge, and further distal from the midline than the second edge. Note that the material has a lower index of refraction than the semiconductor layer, a lower optical absorption than the first electrode, and a lower optical absorption than the second electrode.

In some embodiments, the semiconductor layer includes germanium and/or indium-phosphide. Moreover, the material may include one of polycrystalline silicon, crystalline silicon, indium tin oxide and a semi-metal contact layer. This material may be doped. For example, the doping concentration of the regions and/or the material may be between $10^{17}/cm^3$ and $10^{19}/cm^3$.

Furthermore, the first and second electrodes may be disposed on the substrate in a different vertical layer than that of the optical waveguide and the semiconductor layer. The first electrode may be coupled to the first intervening layer by a first via and the second electrode may be coupled to the second intervening layer by a second via.

Note that the substrate may include a different semiconductor than the semiconductor layer. For example, the different semiconductor may include silicon.

In some embodiments, the electro-absorption modulator includes a buried-oxide layer deposited on the substrate, where the optical waveguide and the semiconductor layer are disposed on the buried-oxide layer.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
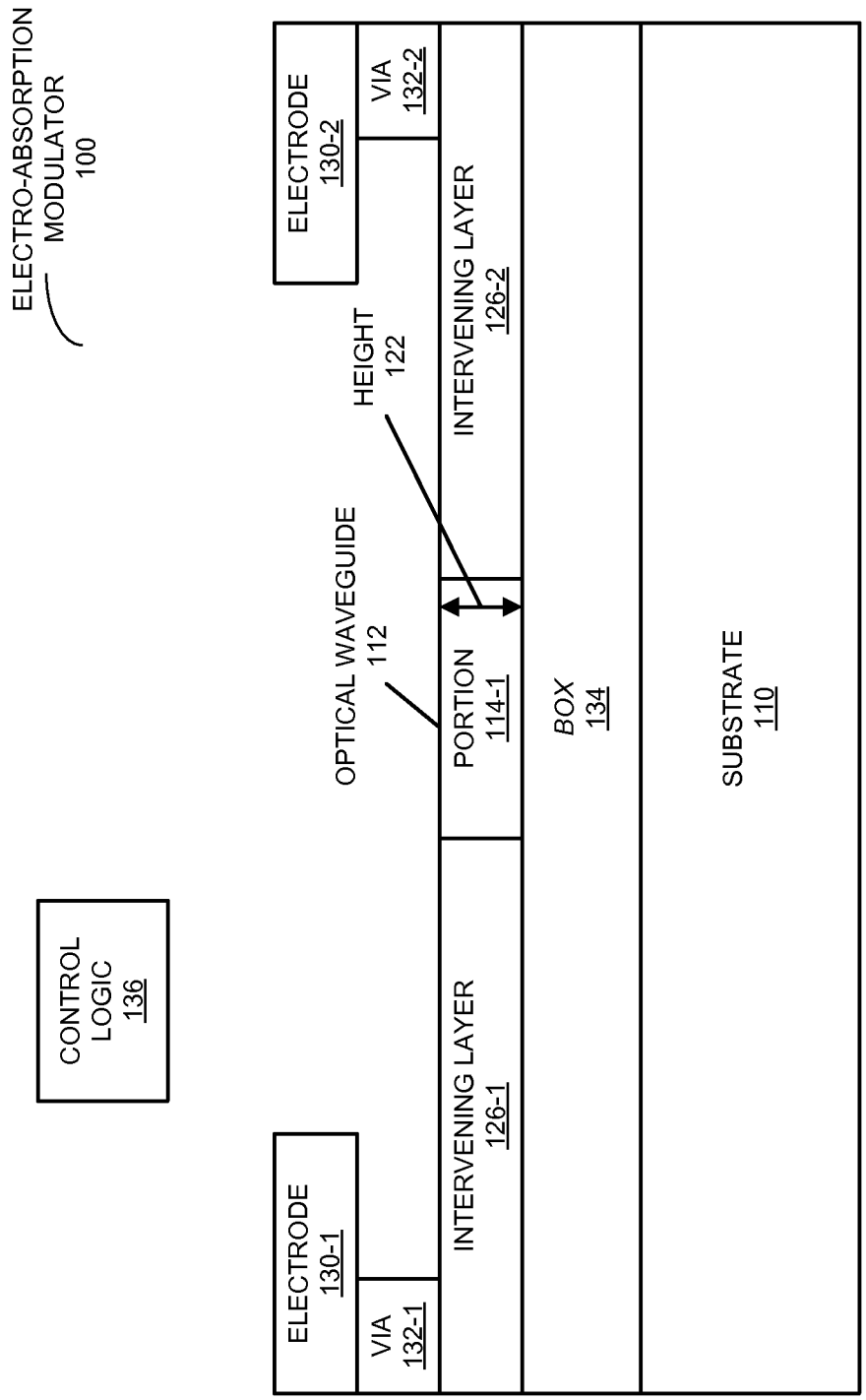
FIG. 1 is a block diagram illustrating a side view of an electro-absorption modulator in accordance with an embodiment of the present disclosure.

Embodiments of an electro-absorption modulator, a system that includes the electro-absorption modulator, and a method for selectively optically modulating an optical signal using the electro-absorption modulator are described. During operation, the optical signal is conveyed, using an optical waveguide in the electro-absorption modulator, to a semiconductor layer that substantially fills a gap between two portions of the optical waveguide. Then, the optical signal is electro-absorption modulated by selectively applying a voltage to electrodes that produces an electric field, approximately perpendicular to the midline of the optical waveguide, in the semiconductor layer. These electrodes are coupled to the edges of the semiconductor layer at the periphery along the width of the semiconductor layer by intervening layers. Furthermore, the intervening layers include a material that has a lower index of refraction than the semiconductor layer, and a lower optical absorption than the electrodes.

This electro-absorption modulator may reduce or eliminate losses in doped layers in the electro-absorption modulator, as well as optical mode mismatch problems. Therefore, the embodiments of the electro-absorption modulator may offer improved performance, thereby facilitating applications such as silicon photonic links.

While a wide variety of materials can be used as a substrate in the electro-absorption modulator (for example, a semiconductor, glass or plastic), in the discussion that follows silicon is used as an illustrative example.

We now describe embodiments of the electro-absorption modulator. In order to reduce the complexity of the existing vertical αSi—Ge-αSi structure and, in order to integrate an FK modulator in the same layer as a silicon optical waveguide, a horizontal configuration can be used. For example, crystal germanium may be grown on the slab layer of a silicon optical waveguide in a silicon-on-insulator (SOI) technology. This selectively grown germanium may then be etched to match the physical size of a silicon-ridge optical waveguide.

Furthermore, both sides or edges of the germanium ridge and the corresponding slab layer of the silicon optical waveguide can be doped for low resistivity to form a hybrid sandwich structure with a low-conductance intrinsic germanium on a silicon narrow strip (having a width on the order of approximately 200-300 nm). Additionally, metal electrodes in other layers may be coupled to the slab layer through metal vias or plugs, thereby forming a metal-semiconductor-metal (MSM)-like device topology. An electrical voltage signal can be applied to the narrow intrinsic germanium strip through the metal electrodes, the doped silicon slab, and the doped germanium to generate a high electrical field (on the order of $10^6$ V/cm) inside of the intrinsic germanium material, thereby achieving FK electro-absorption modulation of an optical signal propagating in the optical waveguide.

There are, however, several problems associated with the aforementioned design. In particular, it may suffer from high insertion loss (and, thus, background absorption) because of the high absorption from the doped sides or edges of the germanium region where there is no modulation. For example, the absorption of the doped germanium material may be as high as 600 dB/cm, thereby introducing a significant insertion loss even for a short electro-absorption-modulator device. In addition, there is an optical mode mismatch between the hybrid modulator optical waveguide structure and the rest of the silicon optical waveguide because of the much higher index of refraction of germanium than that of silicon. As a consequence, the electro-absorption modulator device may suffer extra optical-coupling loss and back reflection when directly butt-coupled to a regular silicon optical waveguide.

Figure 2:
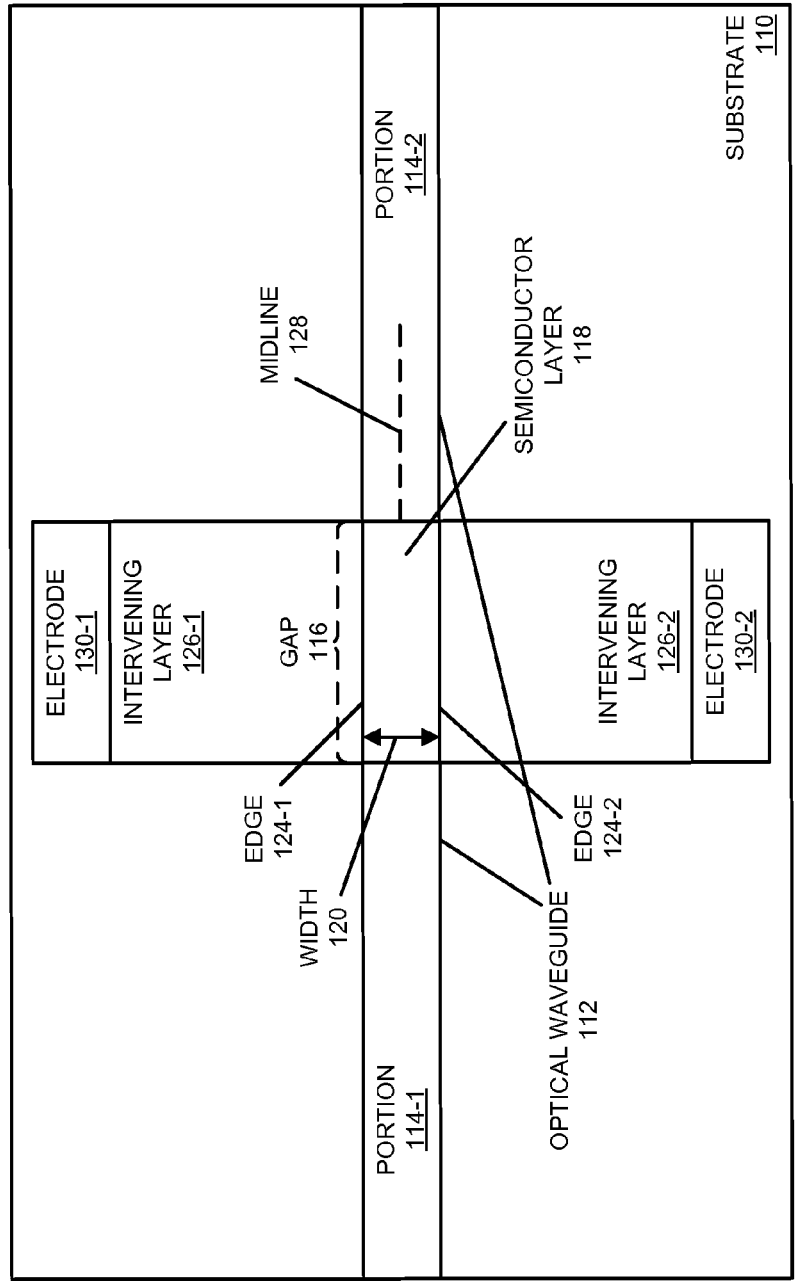
FIG. 2 is a block diagram illustrating a top view of the electro-absorption modulator of FIG. 1 in accordance with an embodiment of the present disclosure.

These problems with a silicon FK electro-absorption modulator are addressed in electro-absorption modulator 100, which is shown in side view in FIG. 1 and top view in FIG. 2. This electro-absorption modulator includes a substrate 110, and an optical waveguide 112, disposed on substrate 110, having portions 114 separated by a gap 116. Moreover, a semiconductor layer 118 is disposed on substrate 110 and substantially fills gap 116. For example, semiconductor layer 118 may include germanium and/or indium-phosphide.

Semiconductor layer 118: is coupled to portions 114; has approximately the same width 120 and approximately the same height 122 as portions 114; and has an edge 124-1 and an edge 124-2 at a periphery along width 120 of semiconductor layer 118. Furthermore, intervening layers 126 in electro-absorption modulator 100 are disposed on substrate 110 distal from a midline 128 of semiconductor layer 118 and are, respectively, coupled to edges 124. These intervening layers include a material. Additionally, electrodes 130 (such as metal electrodes) are coupled, respectively, to intervening layers 126 further distal from midline 128 than edge 124-1, and further distal from midline 128 than edge 124-2.

The material has a lower index of refraction than semiconductor layer 118, a lower optical absorption than electrode 130-1, and a lower optical absorption than electrode 130-2. For example, the material may include one of polycrystalline silicon, crystalline silicon, indium tin oxide and a semi-metal contact layer. Furthermore, the material may be doped. In an exemplary embodiment, the doping concentration may be between $10^{17}/cm^3$ and $10^{19}/cm^3$. Note that by using the material to couple electrodes 130 to semiconductor layer 118, the problems with the aforementioned horizontal silicon FK electro-absorption modulator can be reduced or eliminated because there are low background losses and light is not 'attracted' into the intervening layers 126 or the electrodes 130.

As illustrated in FIG. 1, in some embodiments electrodes 130 are disposed on substrate 110 in a different vertical layer than that of optical waveguide 112 and semiconductor layer 118. Moreover, electrode 130-1 may be coupled to intervening layer 126-1 by via 132-1 (or one or more plugs) and electrode 130-2 may be coupled to intervening layer 126-2 by via 132-2 (or one or more plugs). In some embodiments, electro-absorption modulator 100 may be compatible with a CMOS fabrication process.

Note that substrate 110 may include a different semiconductor than semiconductor layer 118. For example, the different semiconductor may include silicon. Furthermore, in some embodiments electro-absorption modulator 100 includes a buried-oxide layer (BOX) 134 deposited on substrate 110, where optical waveguide 112 and semiconductor layer 118 are disposed on buried-oxide layer 134. Therefore, electro-absorption modulator 100 may be implemented using SOI technology.

In some embodiments, electro-absorption modulator 100 may be fabricated by opening a gap 116 in silicon optical waveguide 112. Then, crystal germanium may be grown in gap 116 on substrate 110. Next, the germanium and the substrate 110 may be removed, leaving a window with a narrow strip of germanium on substrate 110 (approximately 200-300 nm wide). Poly-silicon may then be deposited as intervening layers 126 to fill the etched window. This poly-silicon may be etched to form a hybrid optical waveguide structure that matches the silicon optical waveguide 112 at both ends of gap 116.

Furthermore, the poly-silicon may then be doped and coupled to metal electrodes 130 through vias 132 to form a complete optical-waveguide electro-absorption modulator. Note that the absorption of the doped poly-silicon may be an order of magnitude lower than that of germanium. In addition, this hybrid electro-absorption-modulator optical-waveguide structure may comprise mostly silicon, thereby better matching the optical modes of silicon optical waveguide 112.

Figure 3:
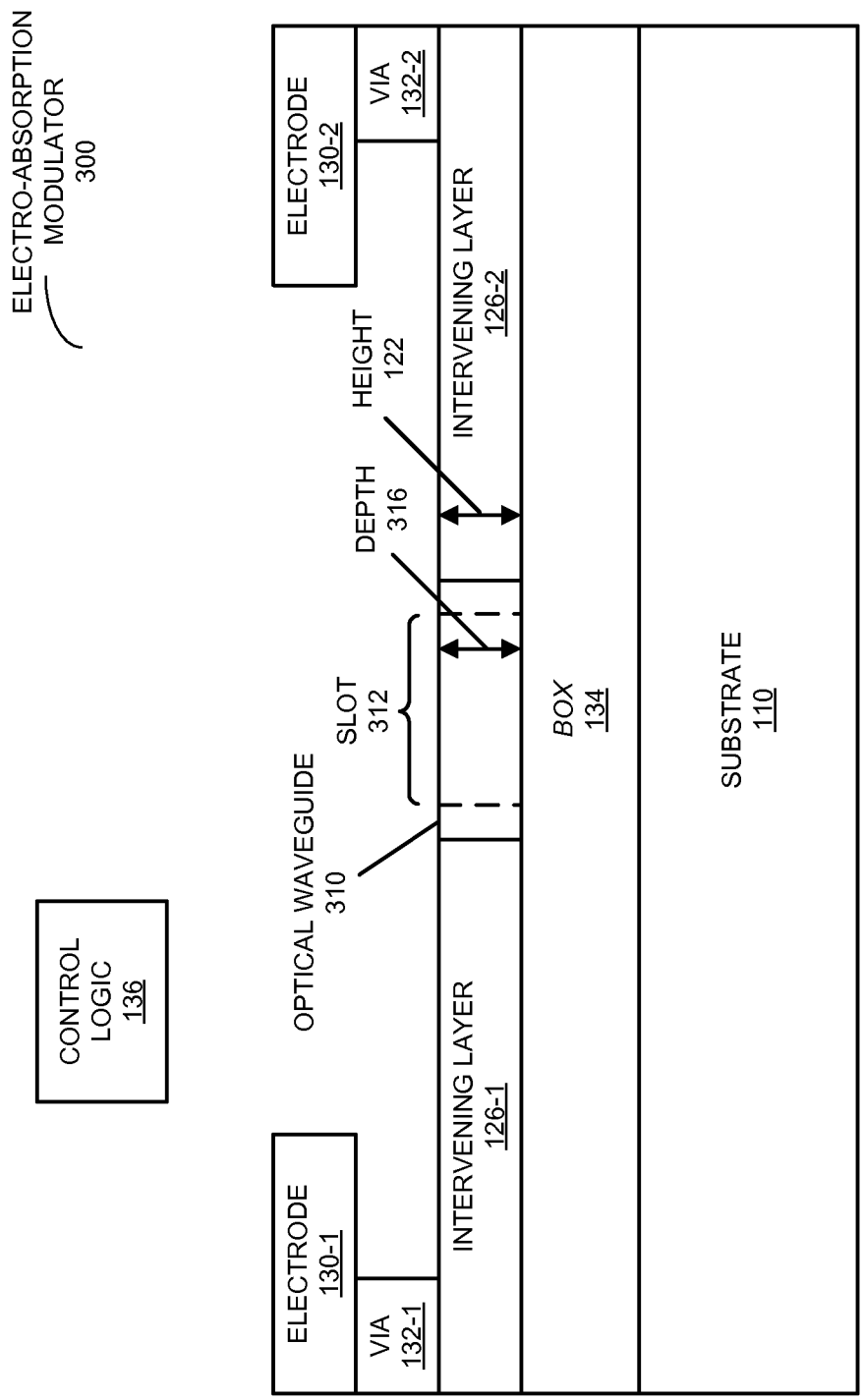
FIG. 3 is a block diagram illustrating a side view of an electro-absorption modulator in accordance with an embodiment of the present disclosure.
Figure 4:
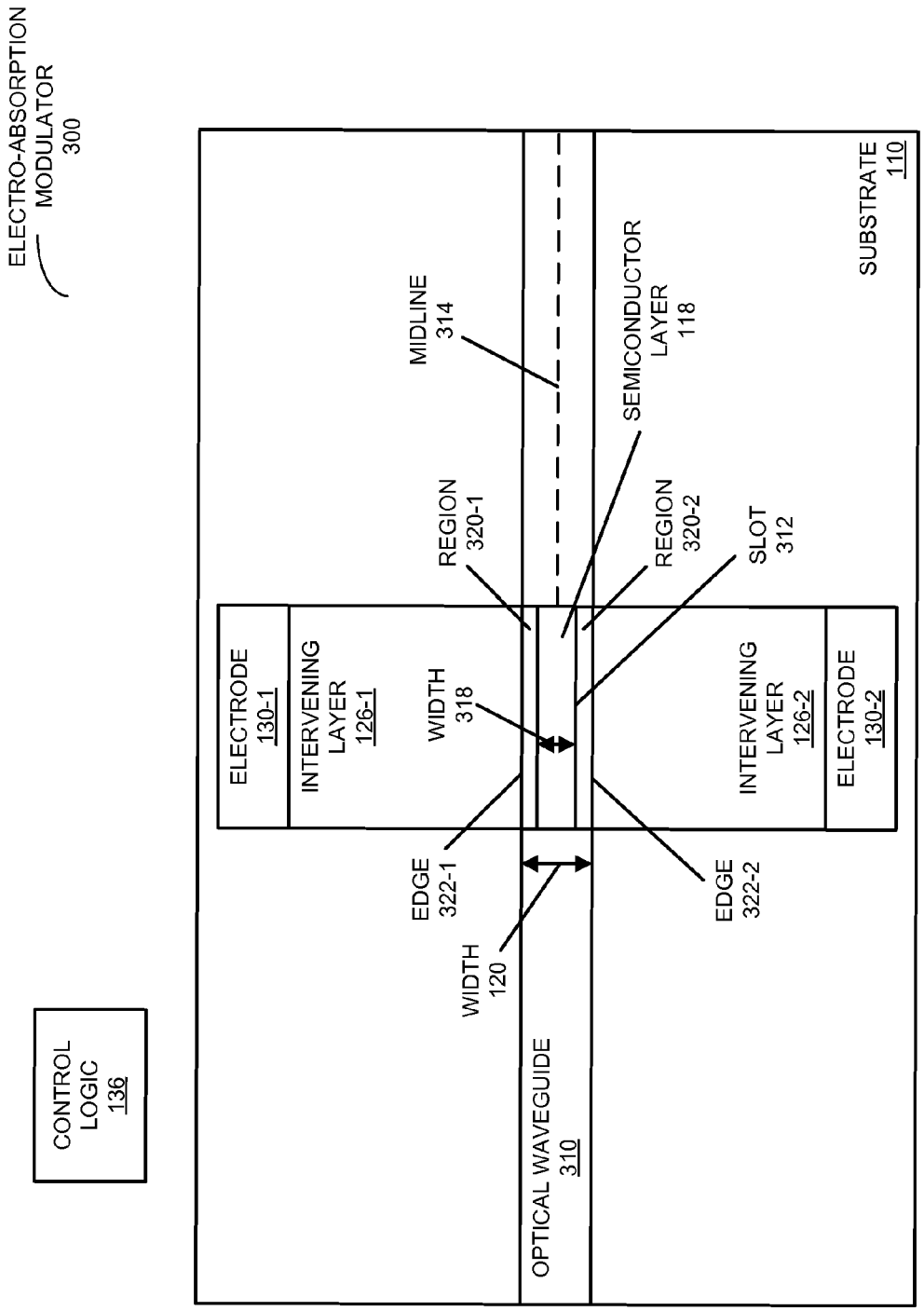
FIG. 4 is a block diagram illustrating a top view of an electro-absorption modulator of FIG. 3 in accordance with an embodiment of the present disclosure.

In another embodiment, the optical waveguide includes a filled slot (as opposed to a filled gap). This is shown in FIG. 3, which presents a block diagram illustrating a side view of an electro-absorption modulator 300, and in FIG. 4, which presents a block diagram illustrating a top view of electro-absorption modulator 300. This electro-absorption modulator includes a substrate 110, and an optical waveguide 310, disposed on substrate 110, having a slot 312 approximately coaxial with a midline 314 of optical waveguide 310. Note that slot 312 has a depth 316 approximately equal to a height 122 of optical waveguide 310 and a width 318 that is less than a width 120 of optical waveguide 310, where regions 320 of optical waveguide 310 external to slot 312 along a width 120 of optical waveguide 310 are doped.

Moreover, a semiconductor layer 118 is disposed on substrate 110 and substantially fills slot 312. For example, semiconductor layer 118 may include germanium and/or indium-phosphide.

Furthermore, intervening layers 126 in electro-absorption modulator 300 are disposed on substrate 110 distal from a midline 314 of optical waveguide 310 and are, respectively, coupled to edges 322 of regions 320. These intervening layers include the material. Additionally, electrodes 130 are coupled, respectively, to intervening layers 126 further distal from midline 314 than edge 322-1, and further distal from midline 314 than edge 322-2.

Note that the material has a lower index of refraction than semiconductor layer 118, a lower optical absorption than electrode 130-1, and a lower optical absorption than electrode 130-2. For example, the material may include one of polycrystalline silicon, crystalline silicon, indium tin oxide and a semi-metal contact layer. Furthermore, the material may be doped. In an exemplary embodiment, the doping concentration of regions 320 and/or the material may be between $10^{17}/cm^3$ and $10^{19}/cm^3$.

As illustrated in FIG. 3, in some embodiments electrodes 130 are disposed on substrate 110 in a different vertical layer than that of optical waveguide 310 and semiconductor layer 118. Moreover, electrode 130-1 may be coupled to intervening layer 126-1 by via 132-1, and electrode 130-2 may be coupled to intervening layer 126-2 by via 132-2. In some embodiments, electro-absorption modulator 300 may be compatible with a CMOS fabrication process.

Note that substrate 110 may include a different semiconductor than semiconductor layer 118. For example, the different semiconductor may include silicon. Furthermore, in some embodiments electro-absorption modulator 300 includes a buried-oxide layer (BOX) 134 deposited on substrate 110, where optical waveguide 310 and semiconductor layer 118 are disposed on buried-oxide layer 134. Therefore, electro-absorption modulator 300 may be implemented using SOI technology.

In some embodiments, electro-absorption modulator 300 may be fabricated by defining slot 312 in silicon optical waveguide 310. Then, germanium may be selectively grown in slot 312. Note that laser-assisted germanium re-crystallization may be used to ensure germanium quality. Next, slot 312 and substrate 110 may be doped for low-resistance contact to metal electrodes 130. While the overall structure is similar to embodiments where poly-silicon is used in intervening layers 126, when crystalline silicon is used even lower optical absorption from the un-modulated material can be obtained.

Note that, during operation, electro-absorption modulator 100 (FIGS. 1 and 2) or 300 may be turned 'on' or 'off' (i.e., may block or pass the light) based on an applied voltage or signal that is controlled or provided by control logic 136. Furthermore, optical waveguides 112 (FIGS. 1 and 2) and/or 310 may convey an optical signal (i.e., light) having wavelengths between 1.1-1.7 μm, such as an optical signal having a fundamental wavelength of 1.3 or 1.55 μm.

In an exemplary embodiment, width 120 of optical waveguides 112 (FIGS. 1 and 2) and/or 310 may be less than 1 μm. For example, width 120 may be between 0.25 and 0.5 μm, but may be as large as 3 μm. Similarly, height 122 may be 0.25 μm. Furthermore, slot 312 may have a width 318 between 200 and 300 nm, but may be as large as 3 μm. Note that intervening layers 126 may have a width (distal from the midline) between 1 and 10 μm.

Figure 5A:
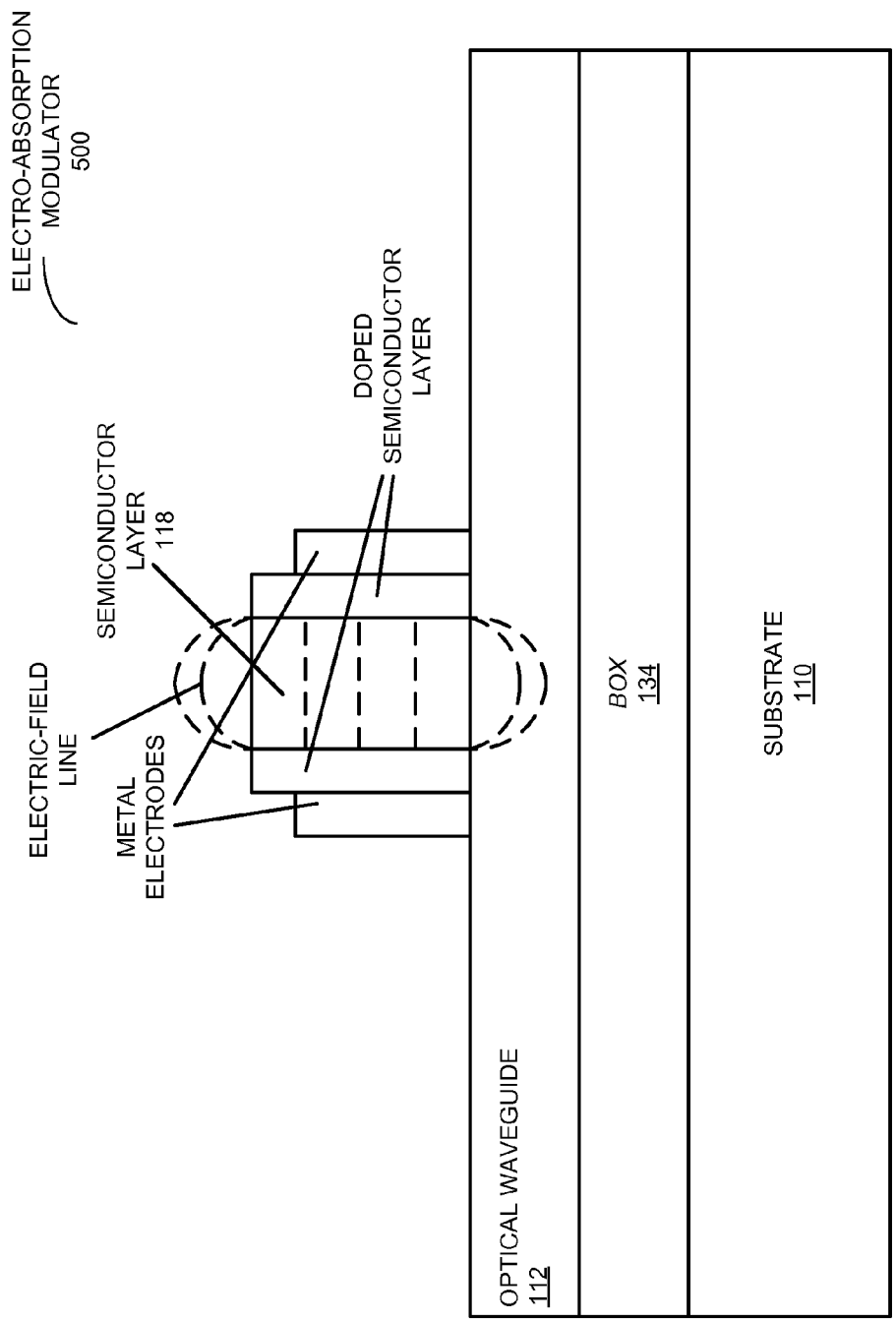
FIG. 5A is a block diagram illustrating a side view of an electro-absorption modulator in accordance with an embodiment of the present disclosure.
Figure 5B:
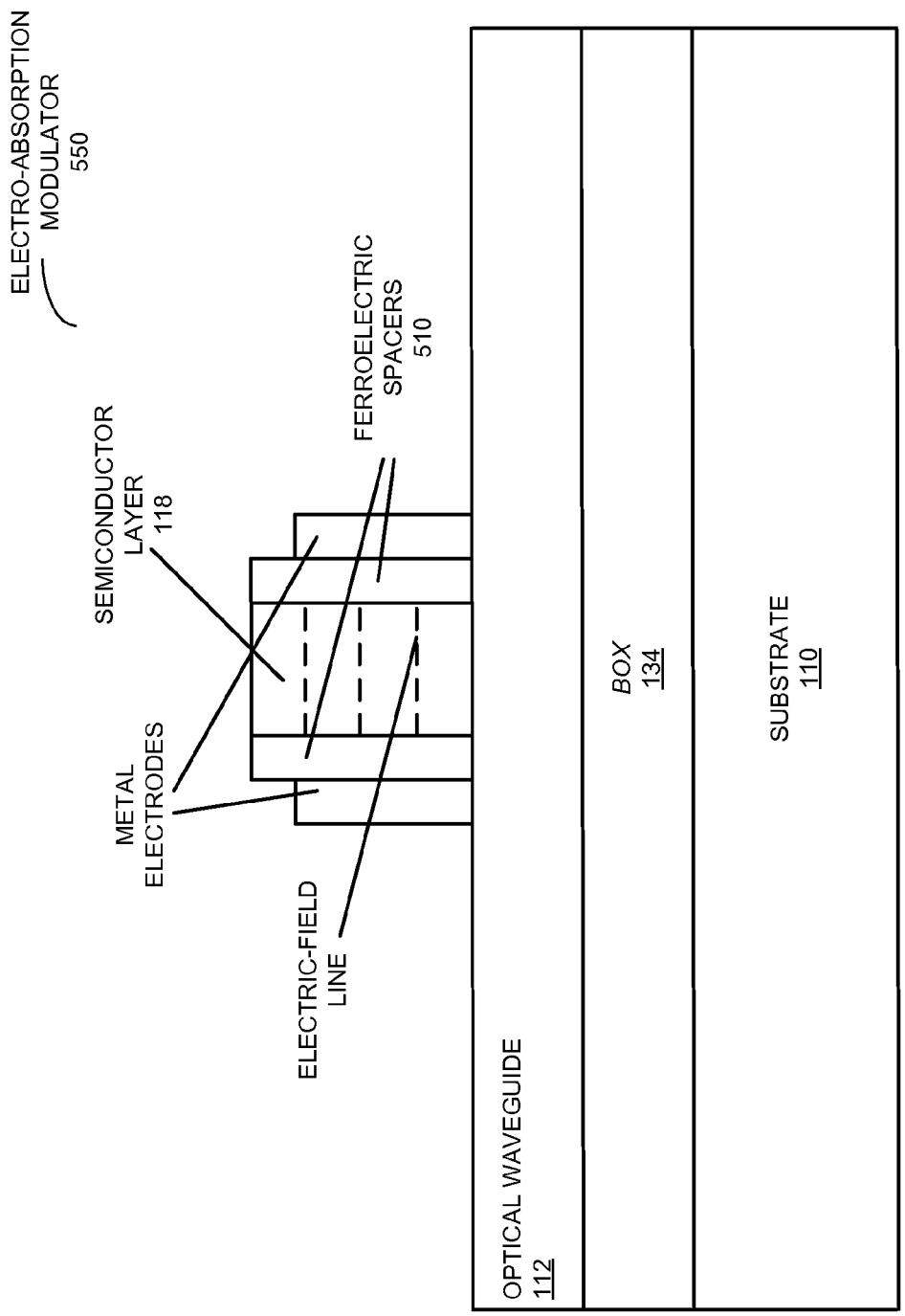
FIG. 5B is a block diagram illustrating a side view of an electro-absorption modulator in accordance with an embodiment of the present disclosure.

In the preceding embodiments, the electric-field lines fringe across semiconductor layer 118 (FIGS. 1-4). This is illustrated in FIG. 5A, which presents a side view of electro-absorption modulator 500 with the electric-field lines shown as dashed lines. However, the electric field in the semiconductor layer (i.e., the active FK electro-absorption modulator) can be enhanced using a ferroelectric material, such as one with a dielectric constant greater than 1000 (e.g., $BaTiO_3$). This is shown in FIG. 5B, which presents a side view of electro-absorption modulator 550. In particular, ferroelectric spacers 510 are added between the metal contacts and the active FK material (such as germanium) in order to generate an internal electric field inside the intrinsic region of the FK junction. As a consequence, the electric-field lines are more parallel or plate-like, thereby increasing the electric-field strength in the active FK material. For example, the electric-field strength in germanium in electro-absorption modulator 100 in FIGS. 1 and 2 may be 4 V/μm. Using the geometry of FIG. 5B with $BaTiO_3$, the electric-field strength in the active FK material may be 7-8 V/μm (the upper estimate includes the affect of the fringing fields). Furthermore, the architecture of FIG. 5B can improve the confinement of the optical mode.

Note that in some embodiments the actual FK junction may not have a pin geometry (as is the case for semiconductor layer 118 in optical waveguide 112 in electro-absorption modulator 100 in FIGS. 1 and 2). Instead, electro-absorption modulator 550 may be a field-effect device with the metal plates having different electrostatic potentials.

Figure 6:
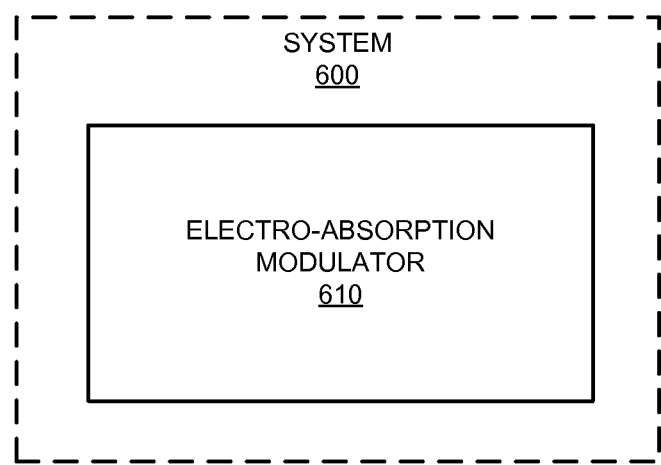
FIG. 6 is a block diagram illustrating a system that includes the electro-absorption modulator of FIG. 1 or 3 in accordance with an embodiment of the present disclosure.

Electro-absorption modulators 100 (FIGS. 1 and 2) and/or 300 (FIGS. 3 and 4) may be used in a variety of applications. This is shown in FIG. 6, which present a block diagram illustrating a system 600 that includes electro-absorption modulator 610. System 600 may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a super-computer, a network-attached-storage (NAS) system, a storage-area-network (SAN) system, and/or another electronic computing device. Note that a given computer system may be at one location or may be distributed over multiple, geographically dispersed locations.

Electro-absorption modulators 100 (FIGS. 1 and 2), 300 (FIGS. 3 and 4), 500 (FIG. 5A) and 550 (FIG. 5B), as well as system 600, may include fewer components or additional components. Although electro-absorption modulators 100 (FIGS. 1 and 2) and/or 300 (FIGS. 3 and 4), as well as system 600, are illustrated as having a number of discrete items, these circuits and devices are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the electro-absorption modulator and system may be implemented more in hardware and less in software, or less in hardware and more in software, as is known in the art. For example, functionality may be implemented in one or more application-specific integrated circuits (ASICs) and/or one or more digital signal processors (DSPs).

Figure 7:
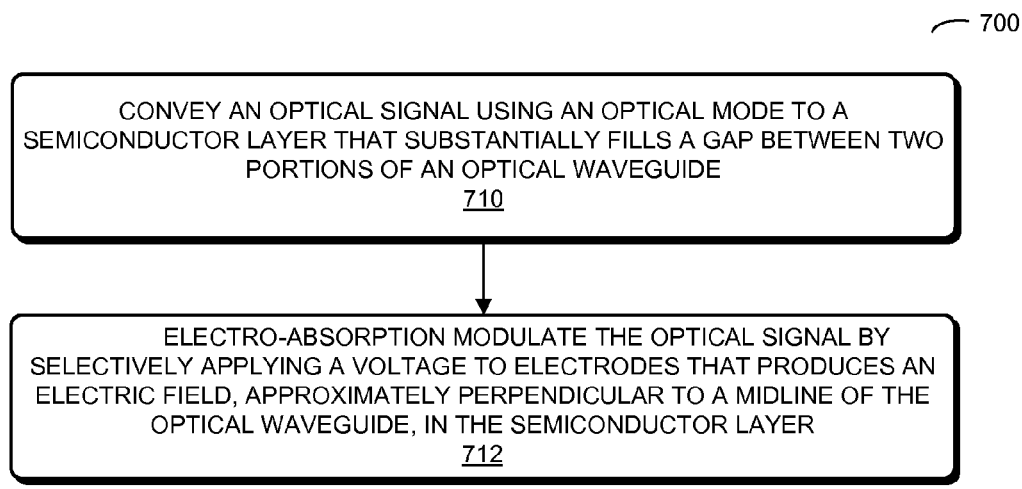
FIG. 7 is a flow chart illustrating a process for selectively optically modulating an optical signal using an electro-absorption modulator in accordance with an embodiment of the present disclosure.

We now describe embodiments of a process. FIG. 7 presents a flow chart illustrating a process 700 for selectively optically modulating an optical signal using an electro-absorption modulator, such as electro-absorption modulator 100 (FIGS. 1 and 2). During operation, the optical signal is conveyed, using the optical waveguide, to the semiconductor layer that substantially fills the gap between the two portions of the optical waveguide (operation 710). Then, the optical signal is electro-absorption modulated by selectively applying a voltage to the electrodes that produces an electric field, approximately perpendicular to the midline of the optical waveguide, in the semiconductor layer (operation 712). Note that these electrodes are coupled to the edges of the semiconductor layer at the periphery along the width of the semiconductor layer by intervening layers, where the intervening layers include the material.

In some embodiments of process 700, there are additional or fewer operations. Moreover, the order of the operations may be changed, and/or two or more operations may be combined into a single operation.

While the preceding embodiments have been illustrated with particular elements and compounds, a wide variety of materials and compositions (including stoichiometric and non-stoichiometric compositions) may be used, as is known to one of skill in the art. Furthermore, these materials and compounds may be fabricated using a wide variety of processing techniques, including evaporation, sputtering, molecular-beam epitaxy, wet or dry etching (such as photo-lithography or direct-write lithography), polishing, etc.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electro-absorption modulator, comprising:
a substrate;
an optical waveguide, disposed on the substrate, having two portions separated by a gap;
a semiconductor layer, disposed on the substrate and substantially filling the gap, wherein the semiconductor layer is coupled to the two portions of the optical waveguide, wherein the semiconductor layer has approximately a same width as the two portions and has approximately a same height as the two portions, and wherein the semiconductor layer has a first edge and a second edge at a periphery along the width of the semiconductor layer;
a first intervening layer disposed on the substrate distal from a midline of the semiconductor layer and coupled to the first edge, and a second intervening layer disposed on the substrate distal from the midline of the semiconductor layer and coupled to the second edge, wherein the first intervening layer and the second intervening layer include a material; and
a first electrode coupled to the first intervening layer further distal from the midline than the first edge, and a second electrode coupled to the second intervening layer further distal from the midline than the second edge, wherein the material has a lower index of refraction than the semiconductor layer, and a lower optical absorption than the first and second electrodes.

2. The electro-absorption modulator of claim 1, wherein the semiconductor layer includes one of germanium and indium-phosphide.

3. The electro-absorption modulator of claim 1, wherein the material includes one of polycrystalline silicon, crystalline silicon, indium tin oxide and a semi-metal contact layer.

4. The electro-absorption modulator of claim 1, wherein the material is doped.

5. The electro-absorption modulator of claim 4, wherein a doping concentration is between $10^{17}/cm^3$ and $10^{19}/cm^3$.

6. The electro-absorption modulator of claim 1, wherein the first electrode and the second electrode are disposed on the substrate in a different vertical layer than that of the optical waveguide and the semiconductor layer; and
wherein the first electrode is coupled to the first intervening layer by a first via and the second electrode is coupled to the second intervening layer by a second via.

7. The electro-absorption modulator of claim 1, wherein the substrate includes a different semiconductor than the semiconductor layer.

8. The electro-absorption modulator of claim 7, wherein the different semiconductor includes silicon.

9. The electro-absorption modulator of claim 1, further comprising a buried-oxide layer deposited on the substrate, wherein the optical waveguide and the semiconductor layer are disposed on the buried-oxide layer.

10. A method for electro-absorption modulating an optical signal, comprising:
conveying the optical signal, using an optical waveguide, to a semiconductor layer substantially filling a gap between two portions of the optical waveguide, wherein the semiconductor layer has approximately a same width as the two portions and has approximately a same height as the two portions; and
electro-absorption modulating the optical signal by selectively applying a voltage to electrodes that produces an electric field, approximately perpendicular to a midline of the optical waveguide, in the semiconductor layer, wherein the electrodes are coupled to edges of the semiconductor layer at a periphery along the width of the semiconductor layer by intervening layers, wherein the intervening layers include a material having a lower index of refraction than the semiconductor layer, and a lower optical absorption than the first and second electrodes.

11. The method of claim 10, wherein the material includes one of polycrystalline silicon, crystalline silicon, indium tin oxide and a semi-metal contact layer.

12. An electro-absorption modulator, comprising:
a substrate;
an optical waveguide, disposed on the substrate, having a slot approximately coaxial with a midline of the optical waveguide, wherein the slot has a depth approximately equal to a height of the optical waveguide and a width that is less than a width of the optical waveguide; and wherein two regions of the optical waveguide external to the slot along a width of the optical waveguide are doped;
a semiconductor layer, disposed on the substrate and substantially filling the slot;
a first intervening layer disposed on the substrate distal from the midline of the optical waveguide and coupled to a first edge of a first of the regions, and a second intervening layer disposed on the substrate distal from the midline of the optical waveguide and coupled to a second edge of the regions, wherein the first intervening layer and the second intervening layer include a material; and
a first electrode coupled to the first intervening layer further distal from the midline than the first edge, and a second electrode coupled to the second intervening layer further distal from the midline than the second edge, wherein the material has a lower index of refraction than the semiconductor layer, and a lower optical absorption than the first and second electrodes.

13. The electro-absorption modulator of claim 12, wherein the semiconductor layer includes one of germanium and indium-phosphide.

14. The electro-absorption modulator of claim 12, wherein the material includes one of polycrystalline silicon, crystalline silicon, indium tin oxide and a semi-metal contact layer.

15. The electro-absorption modulator of claim 12, wherein a doping concentration in the regions is between $10^{17}/cm^3$ and $10^{19}/cm^3$.

16. The electro-absorption modulator of claim 12, wherein a doping concentration in the material is between $10^{17}/cm^3$ and $10^{19}/cm^3$.

17. The electro-absorption modulator of claim 12, wherein the first electrode and the second electrode are disposed on the substrate in a different vertical layer than that of the optical waveguide and the semiconductor layer; and
wherein the first electrode is coupled to the first intervening layer by a first via and the second electrode is coupled to the second intervening layer by a second via.

18. The electro-absorption modulator of claim 12, wherein the substrate includes a different semiconductor than the semiconductor layer.

19. The electro-absorption modulator of claim 18, wherein the different semiconductor includes silicon.

20. The electro-absorption modulator of claim 12, further comprising a buried-oxide layer deposited on the substrate, wherein the optical waveguide and the semiconductor layer are disposed on the buried-oxide layer.

* * * * *